United States Patent [19]

Giza

[11] Patent Number: 4,988,280
[45] Date of Patent: Jan. 29, 1991

[54] APPARATUS FOR STRIPPING A MOLDED U-SHAPED ARTICLE FROM AN INJECTION MOLD

[75] Inventor: John P. Giza, Acushnet, Mass.
[73] Assignee: Acushnet Company, New Bedford, Mass.
[21] Appl. No.: 372,224
[22] Filed: Jun. 26, 1989

Related U.S. Application Data

[63] Continuation of Ser. No. 153,103, Feb. 8, 1988, abandoned.

[51] Int. Cl.⁵ ............................................. B29C 45/40
[52] U.S. Cl. ................................... 425/556; 264/318; 264/334; 425/438; 425/441; 425/450.1; 425/DIG. 58
[58] Field of Search ............... 264/318, 334; 425/554, 425/556, 577, 450.1, 436 R, 436 RM, 438, 441, 443, 444, DIG. 58

[56] References Cited

U.S. PATENT DOCUMENTS

| | | | |
|---|---|---|---|
| 1,475,032 | 11/1923 | Shrum et al. | 425/DIG. 58 |
| 3,092,440 | 6/1963 | Rex et al. | 264/334 |
| 3,807,915 | 4/1974 | Rees | 425/436 R |
| 4,307,866 | 12/1981 | Brown | 249/67 |
| 4,822,553 | 4/1989 | Marshall | 425/438 |

FOREIGN PATENT DOCUMENTS

| | | |
|---|---|---|
| 416317 | 8/1967 | Australia . |
| 460367 | 2/1972 | Australia . |
| 45392 | 2/1974 | Australia . |
| 493308 | 3/1977 | Australia . |
| 535283 | 6/1982 | Australia . |
| 2031325A | 4/1980 | United Kingdom . |
| 2040215A | 8/1980 | United Kingdom . |

OTHER PUBLICATIONS

Polentz, "Saving Space with the Liquid Spring", pp. 268-270, 1966, McGraw-Hill.

Primary Examiner—Timothy Heitbrink
Attorney, Agent, or Firm—Lucas & Just

[57] ABSTRACT

A cavity stripper which is positioned between two mold plates of a mold is used to remove a molded U-shaped article from a cup in one of the mold plates. The cavity stripper is movably attached to the mold plate that houses the cup. The cavity stripper is spring loaded such that it follows the moving mold plate for a short distance and by mechanical interference urges the molded article to remain with the mandrel during opening operations.

21 Claims, 3 Drawing Sheets

APPARATUS FOR STRIPPING A MOLDED U-SHAPED ARTICLE FROM AN INJECTION MOLD

This is a continuation of application Ser. No. 153,103, filed Feb. 8, 1988, now abandoned.

The present invention relates to molds and more particularly to an improved apparatus and method for stripping a molded U-shaped article from the mold.

Generally, molded U-shaped articles are formed by using an injection molding machine which comprises a molding unit and an injection unit. The molding unit has a frame on which a mold is mounted and a hydraulic apparatus for opening and closing the mold. The injection unit fluidizes plastic material and injects the fluidized plastic material into the mold.

The mold typically comprises two mold plates. One mold plate houses a plurality of cup molds while the other mold plate has an equal plurality of mandrels which are registered for a respective cup mold. When the mold is closed, one mandrel fits inside one cup mold and a closed cavity is formed. The closed cavity defines the shape of the molded U-shaped article.

Conventionally, a molded U-shaped article is formed by injecting plastic material into the closed cavity of the mold and allowing the plastic material to solidify. The hardened molded article is then removed from the mold by opening the mold.

Typically, the molded U-shaped article is intended to stick on the mandrel when the mold is opened and an ejector is used to push the molded article off of the mandrel once the molded article clears the cup mold. The molded article falls away from the mold due to gravity.

A problem associated with this type of injection molding machine is that the molded article often sticks in the cup mold. When the molded article sticks in the cup mold, either the machine is stopped and an operator physically removes the article or the supply of fluidized plastic material is cut off from that cavity and eventually, when enough cavities become blocked, the machine is shut down and an operator physically removes the stuck articles.

A solution to the sticking problem has been to coat the cup mold with a chemical compound such as a conventional mold release agent. Although this release agent does help, it eventually wears off and the molded articles stick.

Applicant has discovered an apparatus and method to prevent molded U-shaped articles from sticking in injection molding machines of the type having a mandrel and a cup mold. Specifically, applicant has discovered an apparatus and method for stripping the molded U-shaped articles from the cup mold which virtually eliminate the sticking of molded articles in the cup mold.

The present invention has been proven to provide especially good results in the manufacture of golf ball cover halves.

BRIEF DESCRIPTION OF THE DRAWINGS

These and other aspects of the present invention may be more fully understood with reference to the drawings wherein:

Referring to FIG. 1, an injection molding machine 10 is shown employing the improved mold of the present invention. Mold machine 10 employs injection unit 12 and molding unit 14. Injection unit 12 feeds fluidized plastic material to nozzle 16 which injects the plastic material into mold 18.

Figure 1:
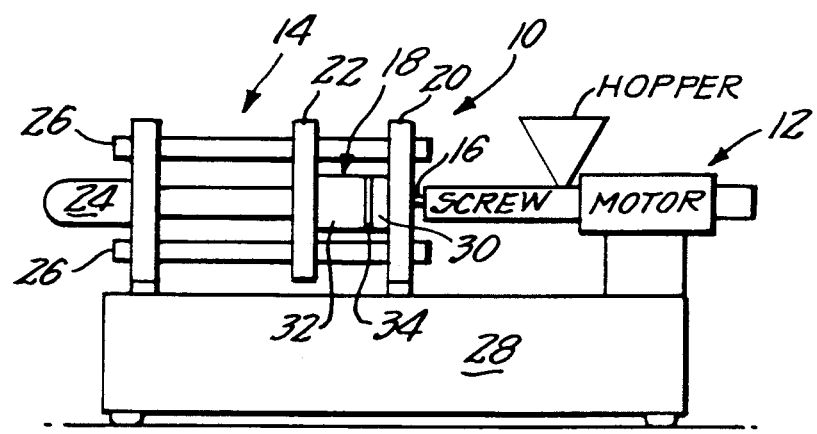
FIG. 1 illustrates an injection molding machine in a closed position employing the present invention.

Molding unit 14 comprises mold 18, fixed platen 20 and movable platen 22. Hydraulic cylinder 24 moves platen 22 thereby opening and closing mold 18. Tie rods 26 are used to guide movable platen 22. Both injection unit 12 and molding unit 14 are mounted on base 28.

Mold 18 comprises fixed mold plate 30 which is fixed to platen 20 and movable mold plate 32 which is fixed to movable platen 22. Positioned between fixed mold plate 30 and movable mold plate 32 is cavity stripper plate 34. Cavity stripper plate 34 is movably fixed to fixed mold plate 30. Although not shown, it is to be understood that fixed mold plate 30 houses a plurality of cup molds and that movable mold plate 32 houses a plurality of mandrels which are registered with the cup molds.

Figure 2:
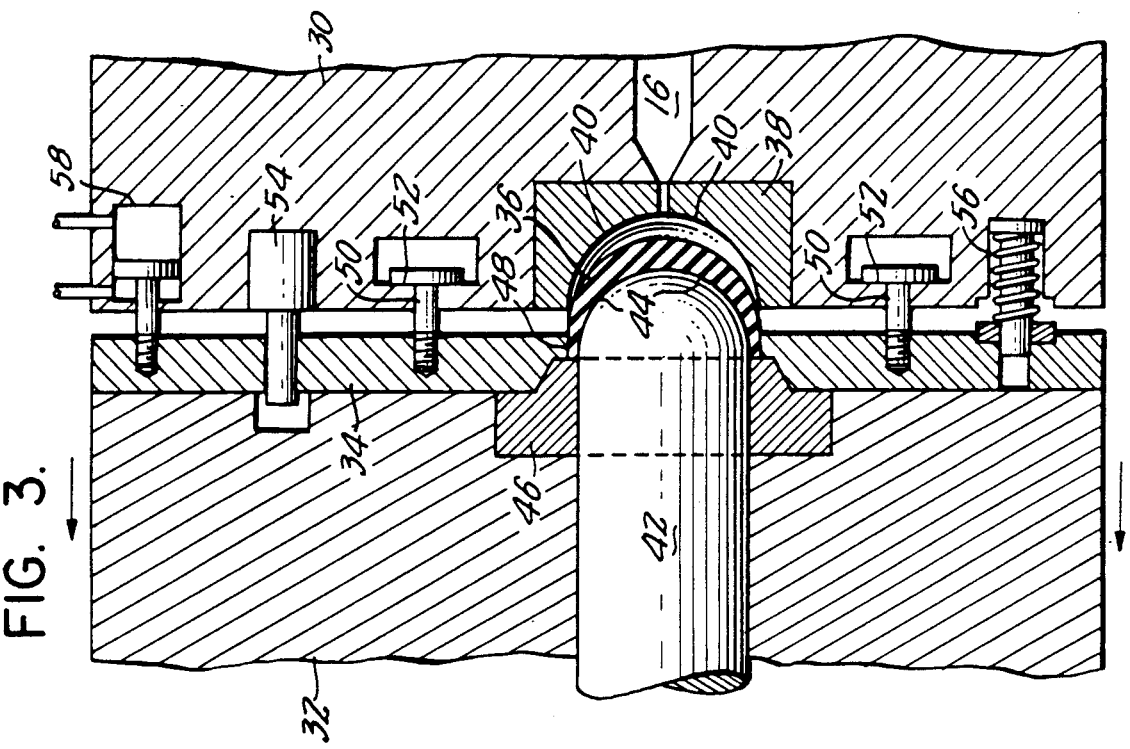
FIG. 2 is a cross-sectional view through a closed mold employing the present invention.

FIG. 2 is a cross-sectional view of mold 18 through a single closed cavity. Nozzle 16 extends into fixed mold plate 30 such that it can inject the closed cavity with fluidized plastic material. The closed cavity is shown with molded U-shaped article 36 therein.

Cup mold 38 is fixed inside mold plate 30. Effective cup mold inner surface 40 defines a portion of the boundary of the closed cavity in which molded U-shaped article 36 is formed. Mandrel 42 is fixed on movable mold plate 32 and effective mandrel outer surface 44 defines another portion of the boundary of the closed cavity in which molded U-shaped article 36 is formed. Ejector 46 is movably fixed in movable mold plate 32. Ejector 46 operates in a conventional manner to push molded U-shaped article 36 off of mandrel 42 when mold 18 is opened and once molded U-shaped article 36 is clear of cup mold 38 and cavity stripper plate 34. A bore through cavity stripper plate 34 is in registration with cup mold 38 and mandrel 42 such that bore wall 48 also defines a portion of the boundary of the closed cavity in which molded U-shaped article 36 is formed.

Cavity stripper plate 34 is movably attached to fixed mold plate 30 by means of bolts 50. Heads 52 of bolts 50 ensure that cavity stripper plate 34 moves a set distance from fixed mold plate 30. A suitable set distance for cavity stripper plate 34 to move is about 1 cm. Good results are obtained when the distance that cavity stripper plate 34 moves from fixed mold plate 30 is about 0.5 cm. Guide pin 54 is used to aid in aligning cavity stripper plate 34 during its movements.

To urge cavity stripper plate 34 away from fixed mold plate 30, compression spring means 56 is positioned in fixed mold plate 30 and applies a force against cavity stripper plate 34 such that when mold 18 is opened, cavity stripper plate 34 is forced to move away from fixed mold plate 30 until the movement of cavity stripper plate 34 is halted by bolts 50. Any compression spring means can be used, such as a compression-type helical spring or a hydraulic means, which is coordinated to push cavity stripper plate 34 away from fixed mold plate 30 for a fixed distance at the same time as mold 18 is opened and movable mold plate 32 moves away from fixed mold plate 30. Good results are obtained with a Belleville spring that provides about 1900 pounds of pressure to cavity stripper plate 34. Thus, cavity stripper plate 34 follows movable mold plate 32 a short distance upon initial opening of the mold and is then halted by bolts 50.

When closing mold 18, good results are obtained by first joining cavity stripper plate 34 to fixed mold plate 30 and then moving movable mold plate 32 to fully close mold 18 and form a closed cavity.

In order to join cavity stripper plate 34 to fixed mold plate 30, conventional mechanical means 58 is employed. Mechanical means 58 is a conventional hydraulic cylinder arrangement.

The surface area of bore wall 48 is less than the surface area of effective mandrel outer surface 44 and preferably the surface area of bore wall 48 is about one half the size of the surface area of effective mandrel outer surface 44. Good results are obtained with bore wall 48 having a surface area about one fourth that of the surface area of effective mandrel outer surface 44.

Figure 3:
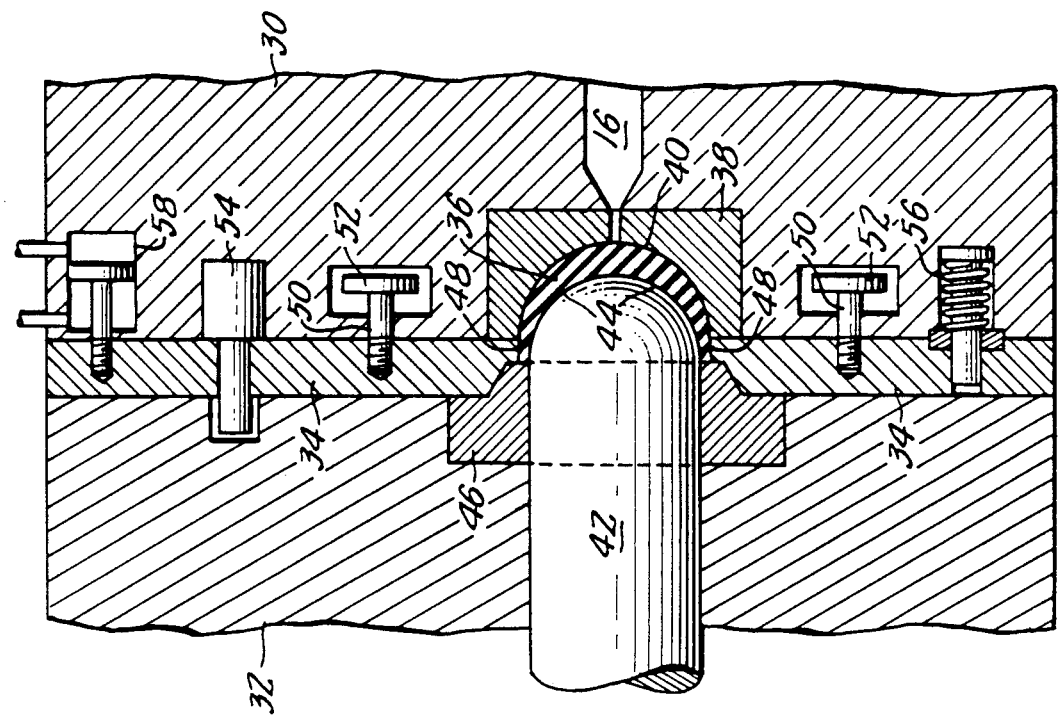
FIG. 3 is a cross-sectional view through the mold of FIG. 2 wherein the mold is partially open.

The method of operation of the present invention will now be described with reference to FIGS. 3 and 4. FIG. 3 illustrates a portion of mold 18 just as it starts to open. Compression spring means 56 urges cavity stripper plate 34 to follow movable mold plate 32 as it moves away from fixed mold plate 30. At this point in time, cavity stripper plate 34 abuts movable mold plate 32 and has moved away from fixed mold plate 30.

Due to the mechanical interference exerted by bore wall 48 on molded U-shaped article 36 during opening of mold 18, molded U-shaped article 36 sticks to mandrel 42 and not to cup mold 38, said mechanical interference being tangential to a plane of contact between said U-shaped article 36 and the bore wall 48. The distance which cavity stripper plate 34 moves in abutment with movable mold plate 32 is such that molded U-shaped article 36 is broken loose from cup mold 38.

Figure 4:
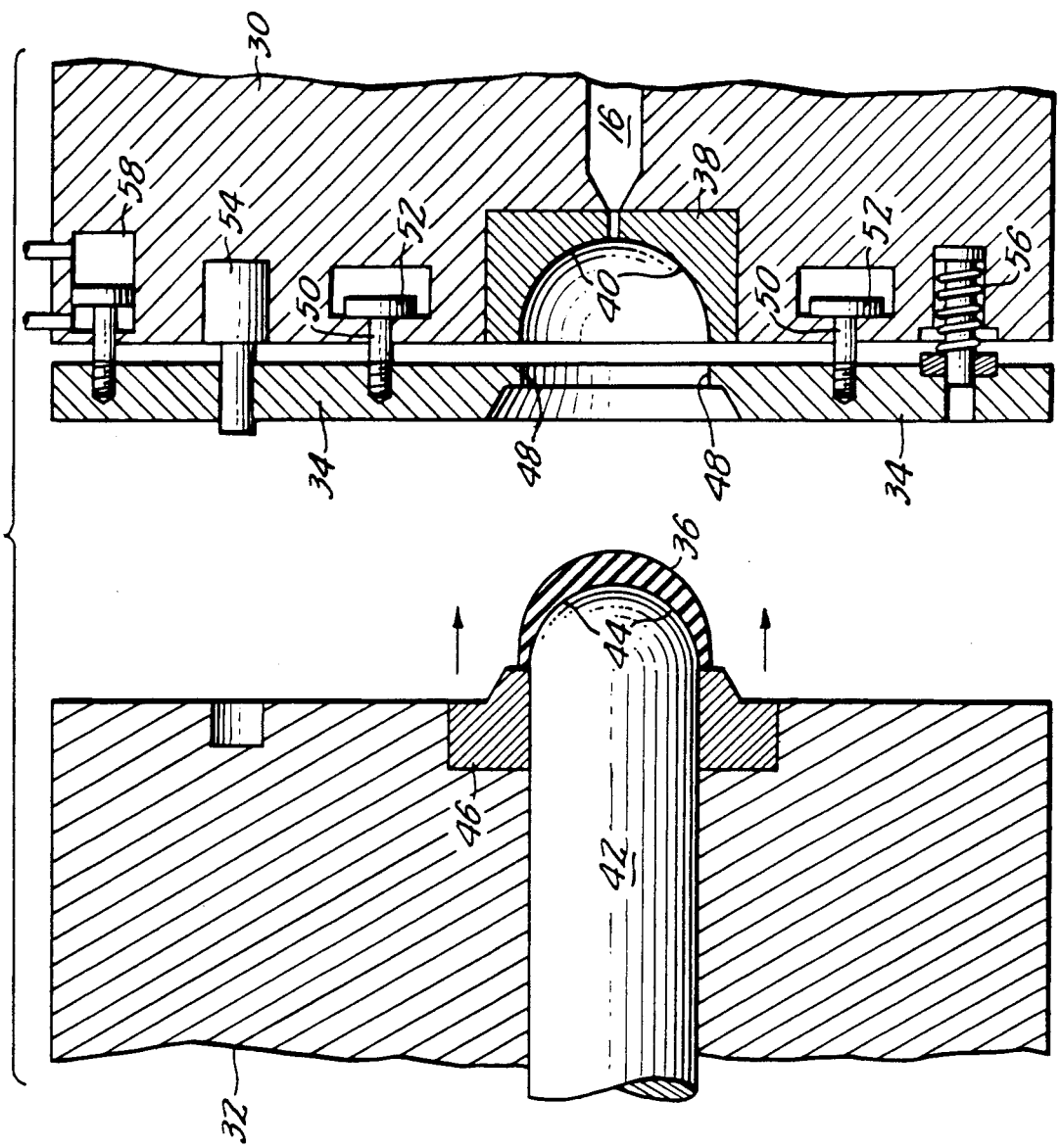
FIG. 4 is a cross-sectional view through the mold of FIG. 3 wherein the mold is in an open position.

FIG. 4 illustrates the portion of mold 18 shown in FIG. 3 at a point in time subsequent to that shown in FIG. 3. Movable mold plate 32 is still moving away from fixed mold plate 30. In FIG. 4 cavity stripper plate 34 is not moving. In order to remove molded U-shaped article 36 from mandrel 42, ejector 46 pushes molded U-shaped article off of mandrel 42 and, due to the force of gravity, molded U-shaped article 36 falls free of mold 18. Once mandrel 42 is clear, mold 18 is closed and fluidized plastic material is injected into the closed cavity formed by mandrel 42, cavity stripper plate 34 and cup mold 38.

Figure 5:
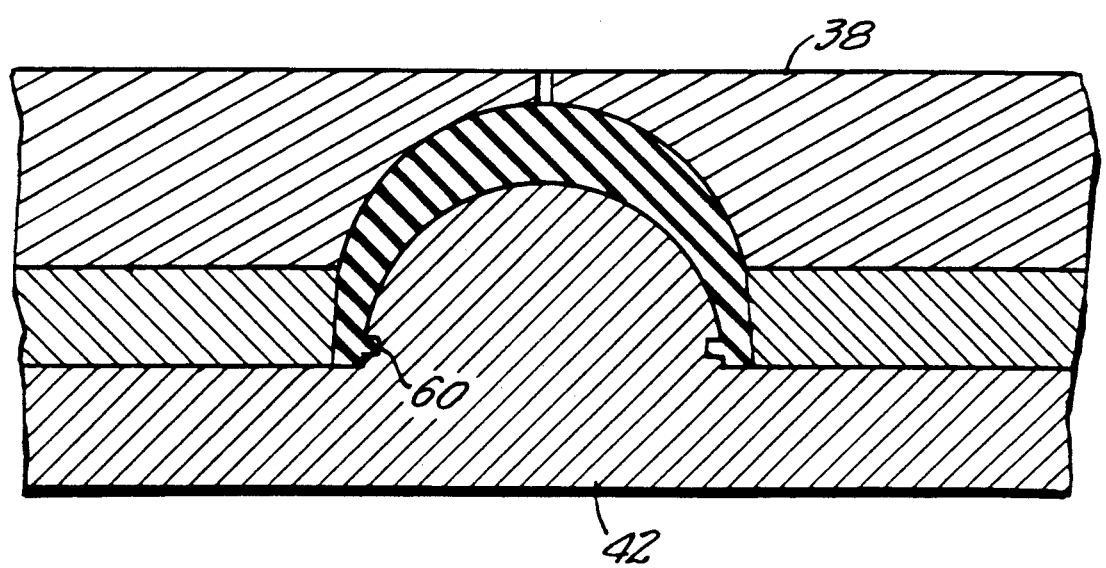
FIG. 5 is an alternative mandrel configuration.

To assist cavity stripper plate 34 to strip molded U-shaped article 36 from cup mold 38, mandrel 42 can be tapered at the base where the ejector 46 meets mandrel 42. This tapering aspect of mandrel 42 is conventional. Alternatively or additionally, the base of mandrel 42 is groove 60 to assist in stripping molded U-shaped article 36 from cup mold 38. FIG. 5 illustrates mandrel 42 with groove 60. Preferably, mandrel 42 has groove 60.

Cavity stripper plate 34 is illustrated as a plate having a bore therethrough that is in registration with mandrel 42 and cup mold 38. Cavity stripper plate 34 can also be an individual ring which is in registration with cup mold 38 and mandrel 42. In the employment of such cavity stripping rings, the number of rings equals the number of mandrels and cup molds. Alternatively, cavity stripper plate 34 can comprise diametrically opposed hands that partially encircle the base of molded U-shaped article 36. Thus, instead of a closed ring, these hands merely apply a mechanical interference to a portion of the base of the molded article.

The present invention discloses cup mold 38 affixed to and cavity stripper plate 34 movably affixed to fixed mold plate 30 and mandrel 42 affixed to movable mold plate 32. Obviously, mandrel 42 could be fixed to fixed mold plate 30 and cup mold 38 and cavity stripper plate 34 could be part of movable mold plate 32. In such a case, the present invention would function in the same manner except the direction of movement would change with respect to the plates 30, 32 and 34.

It will be understood that the claims are intended to cover all changes and modifications of the preferred embodiments of the invention, herein chosen for the purpose of illustration, which do not constitute a departure from the spirit and scope of the invention.

What is claimed is:

1. In an improved mold for an injection molding machine having a first mold plate and a second mold plate, said first mold plate having a cup mold affixed therein, and said second mold plate having a mandrel affixed thereon, said mandrel in registration with said cup mold, said mandrel having an outer surface and said cup mold having an inner surface, the improvement comprising:

a cavity stripper plate movably attached to said first mold plate and positioned between said first mold plate and said second mold plate, said cavity stripper plate having a bore therethrough, said bore having a substantially smooth wall extending throughout said bore and said bore in registration with said mandrel and said cup mold such that when said mold is closed, the mandrel outer surface, the cup mold inner surface and the substantially smooth wall of said bore substantially define a closed cavity in which a molded U-shaped article can be formed, said molded U-shaped article having exterior walls substantially without exterior projections;

spring means for forcing said cavity stripper plate away from said first mold plate when said mold is opened; and said substantially smooth wall of said bore applying mechanical interference on the U-shaped article when said mold is opened, said mechanical interference being tangential to a plane of contact between the exterior walls of said molded U-shaped article and the substantially smooth wall of said bore when said mold is opened, thereby stripping said molded U-shaped article from said cup mold and causing said molded U-shaped article to travel with said mandrel.

2. The improved mold of claim 1 wherein the wall of said bore has a surface area less than or equal to about one fourth that of the outer surface area of the mandrel.

3. The improved mold of claim 1 wherein said cavity stripper plate moves from about 0.5 cm. to about 1 cm. away from said first mold plate.

4. The improved mold of claim 1 wherein said spring means is a Belleville spring.

5. The improved mold of claim 1 wherein bolts are used to movably attach said cavity stripper plate to said first mold plate.

6. The improved mold of claim 1 further comprising a mandrel stripping means for urging said molded U-shaped article off of said mandrel, said mandrel stripping means movably attached to said second mold plate.

7. The improved mold of claim 1 wherein said bore consists of a completely smooth wall.

8. In an improved mold for an injection molding machine having a first mold plate and a second mold plate, said first mold plate having a cup mold affixed therein, and said second mold plate having a mandrel affixed thereto, said mandrel in registration with said cup mold, said mandrel having an outer surface and said cup mold having an inner surface, the improvement comprising:
- a cavity stripper member movably attached to said first mold plate and positioned between said first mold plate and said second mold plate, said cavity stripper member having a cavity stripper means, said cavity stripper means consisting of a bore having a substantially smooth wall, said substantially smooth wall of said cavity stripper means, the mandrel outer surface and the cup mold inner surface substantially defining a closed cavity in which a molded U-shaped article is formed, said molded U-shaped article having exterior walls substantially without exterior projections;
- compression spring means for forcing said cavity stripper member away from said first mold plate when said mold is opened; and
- said substantially smooth wall of said cavity stripper means applying a mechanical interference on the U-shaped article when said mold is opened, said mechanical interference being tangential to a plane of contact between said exterior smooth walls of said molded U-shaped article and the substantially smooth wall of said bore thereby stripping said molded U-shaped article from said cup mold and causing said molded U-shaped article to travel with said mandrel when said mold is opened.

9. The improved mold of claim 8 wherein the mechanical interference applied by said substantially smooth wall is applied over an area on said molded U-shaped article that is less than half the mandrel outer surface.

10. The improved mold of claim 8 wherein said cavity stripper member moves between about 0.5 cm. and about 1 cm. from said first mold plate.

11. The improved mold of claim 8 wherein said compression spring means is a Belleville spring.

12. The improved mold of claim 8 further comprising a mandrel stripping means for urging said molded U-shaped article off of said mandrel, said mandrel stripping means movably attached to said second mold plate.

13. The improved mold of claim 8 wherein said bore consists of a completely smooth wall.

14. An injection mold for molding a U-shaped article having exterior walls substantially without exterior projections, said mold comprising first and second mold halves relatively movable between open and closed positions, wherein the first mold half has a cup mold formed therein and the second mold half has a mandrel which enters the cup mold when the two mold halves are brought to the closed position, the injection mold further comprising a cavity stripper member mounted on the first mold half for limited movement towards and away from the first mold half, the cavity stripper member being adjacent the first mold half when the mold halves are in the closed position, said cavity stripper member having cavity stripper means, said cavity stripper means consisting of a bore having a substantially smooth wall, said smooth wall applying mechanical interference on the U-shaped article when said mold is opened, said mechanical interference being tangential to a plane of contact between the exterior walls of said molded U-shaped article and the substantially smooth wall of said bore so that said molded U-shaped is stripped from said cup mold and travels with said mandrel when said mold is opened, said mandrel, said cup mold and said substantially smooth wall of said bore defining a mold cavity when the first and second mold halves are in the closed position, and spring means for urging the cavity stripper member away from the first mold half during initial movement of the mold halves towards the open position, the movement of the cavity stripper member being arrested before the open position is reached.

15. The improved mold of claim 13 wherein the bore consists of a completely smooth wall.

16. The improved mold of claim 14 wherein the spring means is Belleville spring.

17. An injection molding machine for molding of golf ball cover shell halves, said injection molding machine comprising:
- a first mold plate and a second mold plate, said first mold plate having a cup mold affixed therein, said cup mold substantially corresponding in shaped to the outside of a golf ball cover shell half, and said second mold plate having a mandrel affixed thereon, said mandrel in registration with said cup mold, said mandrel having an outer surface and said cup mold having an inner surface:
- a cavity stripper plate movably attached to said first mold plate and positioned between said first mold plate and said second mold plate, said cavity stripper plate having a bore therethrough, said bore having a substantially smooth wall and said bore in registration with said mandrel and said cup mold such that when said mold is closed, the mandrel outer surface, the cup mold inner surface and the substantially smooth wall of said bore substantially define a closed cavity in which said golf ball cover wheel half is molded;
- spring means for forcing said cavity stripper plate away from said first mold plate when said mold is opened; and
- said substantially smooth wall of said bore applying mechanical interference against said golf ball cover shell half when said mold is opened, thereby stripping said golf ball cover shell from said cup mold and causing said golf ball cover shell to travel with said mandrel, said mechanical interference being tangential to a plane of contact between the substantially smooth wall of said bore and the golf ball cover half shell.

18. The improved mold of claim 17 wherein the mechanical interference applied by said substantially smooth wall is applied over an area on said molded golf ball cover shell half that is less than half of the mandrel outer surface.

19. The mold of claim 17 wherein said cavity stripper plate moves from about 0.5 cm. to about 1 cm. away from said first mold plate.

20. The mold of claim 17 wherein said spring means is a Belleville spring.

21. The mold of claim 17 wherein bolts are used to movably attach said cavity stripper plate to said first mold plate.

* * * * *